April 7, 1942. E. A. KOUNKEL Re. 22,062

TRUCK SLEEPER

Original Filed Aug. 5, 1937

INVENTOR.
Earl A. Kounkel

BY Sam J. Slotky
ATTORNEY

Reissued Apr. 7, 1942

Re. 22,062

UNITED STATES PATENT OFFICE 22,062

TRUCK SLEEPER

Earl A. Kounkel, Seattle, Wash., assignor of one-half to Raymond Stabe, Hinton, Iowa Original No. 2,174,499, dated September 26, 1939, Serial No. 157,571, August 5, 1937. Application for reissue September 23, 1941, Serial No. 412,051

9 Claims. (Cl. 296—63)

My invention relates to a sleeper for trucks.

An object of my invention is to provide a sleeper which allows a relief driver to rest or sleep in a space associated with the truck.

A further object of my invention is to provide such a sleeper which will in no way necessitate wastage of space in a truck, and which can be incorporated in a standard structure.

A further object of my invention is to provide a sleeper which works in combination with the front cab seat of the truck so that the relief driver can use the front seat as part of the bed.

A further object of my invention is to provide a sleeper of this type which includes suitable ventilating means for either cool or warm air for the necessary purposes.

A further object of my invention is to provide such a sleeper which when not in use is completely hidden and out of the way.

A further and important object of my invention is to utilize the front space above a truck engine and below the hood thereof for such purposes.

A further object of my invention is to provide the above mentioned objects in a structure of great simplicity which can be manufactured at a reasonable cost.

Figure 1:
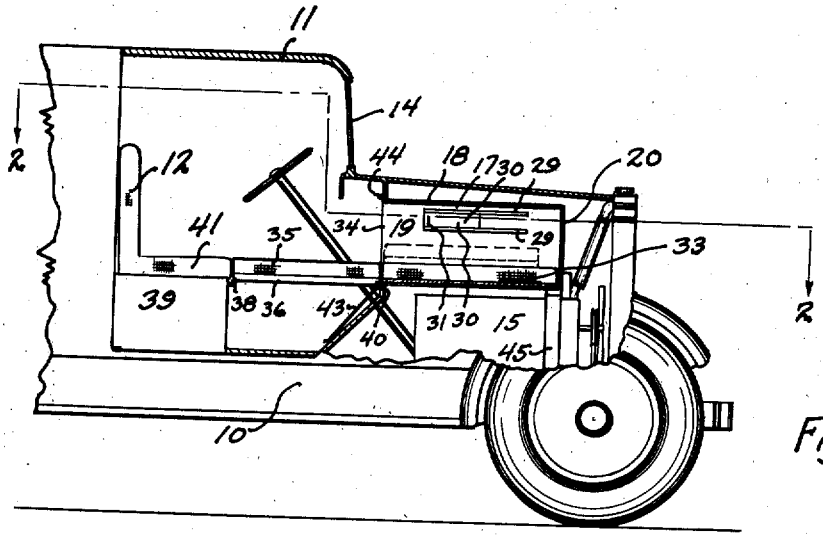
Figure 2:
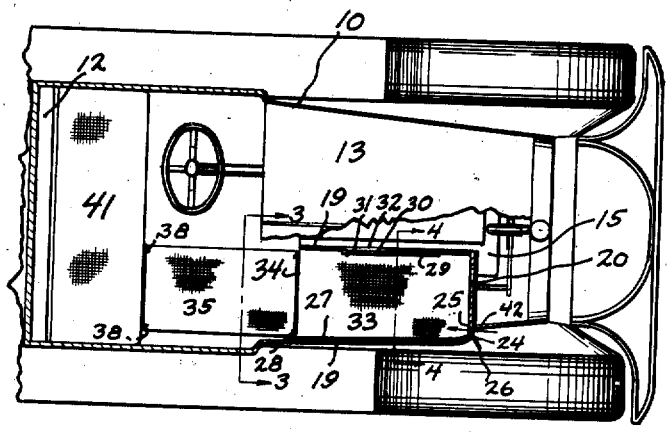
Figure 3:
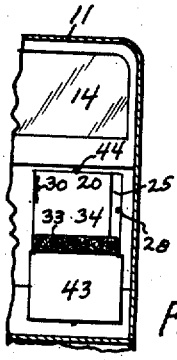
Figure 4:
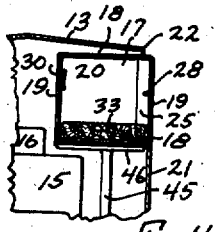
Figure 5:
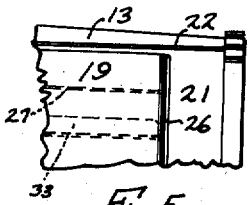
Figure 6:
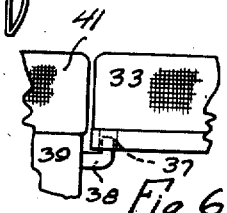

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is a fragmentary sectional view taken approximately along the center line of the sleeper, Figure 2 is a sectional view taken along the lines 2—2 of Figure 1, Figure 3 is a sectional view taken along the lines 3—3 of Figure 2, Figure 4 is a sectional view taken along the lines 4—4 of Figure 2, Figure 5 is a detail of the side of the sleeper, and Figure 6 is an enlarged further detail.

Trucks for accommodating relief drivers in sleeping or reclining positions, usually require an extra amount of space for such purposes, either directly in back of the driver's seat or in other portions of the truck. This results in a waste of space, since the space occupied by the relief driver naturally requires a certain substantial height, as well as length and width, thereby involving the necessity of extra space, which space measured in cubical units, could be utilized for carrying purposes.

I will proceed to show wherein in my invention I have eliminated the necessity of any space requirements by an arrangement which utilizes existing space which is not used for storage purposes.

I have used the character 10 to designate generally the truck body of standard construction, having the cab housing 11, and the seat 12. The seat 12 is of the usual construction, spanning the breadth of the cab. The hood is represented by the character 13, which terminates in the windshield 14. Other details, which are understood, will not be elaborated on herein, with the exception of those parts necessary to the invention. The motor block of the engine is indicated by the character 15, and the usual valve housing by the character 16.

There usually is a substantial amount of space between the motor block and the top of the hood in trucks, and one of the principal objectives in my invention is to utilize such space to provide a certain part of the sleeper. To this end I provide the inwardly projecting chamber 17 having the insulated top and bottom walls 18, the side walls 19 and the end wall 20. This hollow portion projects inwardly and above the motor block and adjacent the valve housing. It will be understood, of course, that this hollow member can be situated at any point adjacent the block without departing from the spirit of my invention.

One of the side walls 19, which is situated at the side of the hood, merges together with the side 21 of the hood top so that when the side 21 is pivoted about the usual pivot 22, (see Figs. 4 and 5), the entire side portion 19 will be lifted to allow access into the inside of the hollow space 17. The side portion 19 also extends practically parallel to the inner wall 19, and curves slightly at 23, and terminates at 24, leaving an opening for ventilating purposes at 25.

A flap 26 is pivoted at 24, which flap can be closed or opened through the medium of the slidable rod 27, which terminates in the button 28, (see Figs. 3, 4 and 5). The inner wall 19 includes the pair of channel members 29, which receive the slidable closure member 30, which is manipulated by means of a handle 31. An opening 32 is provided within the wall 19 (see Fig. 2). Attached above the bottom 18 of the hollow inclosure is the mattress member 33, which terminates at the opening 34, communicating with the cab of the vehicle. A further mattress member 35, which is attached to the steel framework 36, is suitably attached by virtue of the openings such as 37 (see Fig. 6) to the four hooks 38, which are correspondingly attached to the lower portion 39 of the seat 12 and at 40 to the forward part of the cab. The mattress 35 is level with the seating portion 41 of the seat and the mattress 33.

It will now be seen that when the mattress 35 is placed in position as shown in Figure 1, that there is thus provided a complete sleeper unit for the relief driver, since he can rest his head suitably upon the member 41 with the body extending in normal position and resting upon the mattresses 35 and 33. The inclosure 17 receives the space approximately between the knees and the feet, since there is ample space in the cab for the rest of the body.

Also, ventilation is provided in the warmer months by opening the flap 26 by virtue of the rod 27, allowing a direct rush of cooling air through the opening 25 in the direction of the arrow 42, which cools the interior of the inclosure, thereby resulting in comfort to the occupant of the sleeper. Correspondingly, in the winter months, the flap 26 can be closed in the same manner and the closure member 30 can be forced inwardly within the channels 29 thereby leaving the opening 32 exposed, which allows the warm air from the motor to circulate through the inclosure 17. In this manner, since the inclosure is well insulated, a very convenient means is formed for providing the proper ventilation for any season, resulting in maximum comfort since the various openings can be manipulated as desired.

After use, the frame 36 is lifted from the hooks 38, and the same is placed within the inclosure 17 and on top of the mattress 33 as shown in the dotted lines in Figure 1. A door 43, which is suitably hinged so as to clear the forward hooks 38, is then pushed inwardly and engaged with the latch 44, thereby closing the opening. Bedding, etc., can be placed inside of the inclosure, also. The rear end of the inclosure 17 is supported in a suitable manner by means of the brace member 45, which is supported from a portion of the chassis, and which includes the transverse portion 46 for attachment to the inclosure.

It will now be seen that I have provided a sleeper which allows a relief driver to rest or sleep in a space associated with the truck, which conserves space in that no extra spatial requirements are necessary other than that involving the standard construction, that I have provided a sleeper which includes suitable ventilating means for any season, that I have provided a sleeper which is completely out of the way when not in use, that I have provided a sleeper which uses the extra space above an automobile engine for the necessary purposes, that I have provided a sleeper which can be manufactured at a reasonable cost.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

What I claim and desire to secure by Letters Patent is:

1. In combination with a truck hood and forward cab seat, a hollow compartment positioned beneath said hood and adjacent the truck engine, means bridging the space between the compartment and the seat to form a complete full length sleeper, and means including a normally vertically positioned member disposed adjacent to said compartment and forming a portion of the cab wall adapted to be moved downwardly to such a position as to allow access to said compartment to utilize the same as a portion of the sleeper.

2. In combination with a truck hood and forward cab seat, a hollow compartment positioned beneath said hood and adjacent the truck engine, means bridging the space between the compartment and the seat to form a complete full length sleeper, and means including a normally vertically positioned member disposed adjacent to said compartment and forming a portion of the cab wall adapted to be moved downwardly to such a position as to allow access to said compartment to utilize the same as a portion of the sleeper, said forward cab seat including projecting hooks upon which said bridging means is secured.

3. In a motor truck sleeper, the combination with the cab, the hood which extends forwardly from the cab and has the engine thereunder, and the driver's seat which extends across the cab therein, of a sleeper support extending forwardly through the cab at one side thereof from the driver's seat and under the hood and along one side of the engine.

4. A motor truck sleeper as set forth in claim 3, wherein the sleeper support includes an intermediate removable member.

5. A motor truck sleeper as set forth in claim 3 and an enclosure for the sleeper support under the hood.

6. A motor truck sleeper as set forth in claim 3, wherein the sleeper support includes an intermediate removable member, said intermediate member being of such a size as to be disposed upon the forward portion of the sleeper support when the support is not in use.

7. A motor truck sleeper as set forth in claim 3, wherein the sleeper support includes an intermediate removable member supported upon suspension means at either end, and adapted to be removed therefrom.

8. A motor truck sleeper as set forth in claim 3, wherein the sleeper support includes an intermediate removable member supported upon hooks at either end, and adapted to be removed therefrom.

9. A motor truck sleeper as set forth in claim 3, wherein the sleeper support includes an intermediate removable member, and an enclosure for the sleeper support is provided under the hood, said intermediate member being of such a size as to allow its storage in said enclosure when the sleeper support is not in use.

EARL A. KOUNKEL.